Dec. 31, 1940.   J. J. GAQUINTO   2,227,340
WHEEL MOUNTING
Filed Aug. 20, 1940

Inventor
Jerry Jos Gaquinto

By *Clarence A. O'Brien*

Attorney

Patented Dec. 31, 1940

2,227,340

UNITED STATES PATENT OFFICE 2,227,340

WHEEL MOUNTING

Jerry J. Gaquinto, Passaic, N. J.

Application August 20, 1940, Serial No. 353,431

3 Claims. (Cl. 301—9)

This invention relates to a wheel mounting for motor vehicles, and has for the primary object the provision of a device of this character which will permit a wheel to be easily and quickly applied and removed and when applied will positively lock the wheel against accidental removal or from having any movement with respect to the brake drum of the vehicle.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation illustrating a motor vehicle wheel removably secured on a brake drum of a vehicle in accordance with the present invention.

Figure 1:
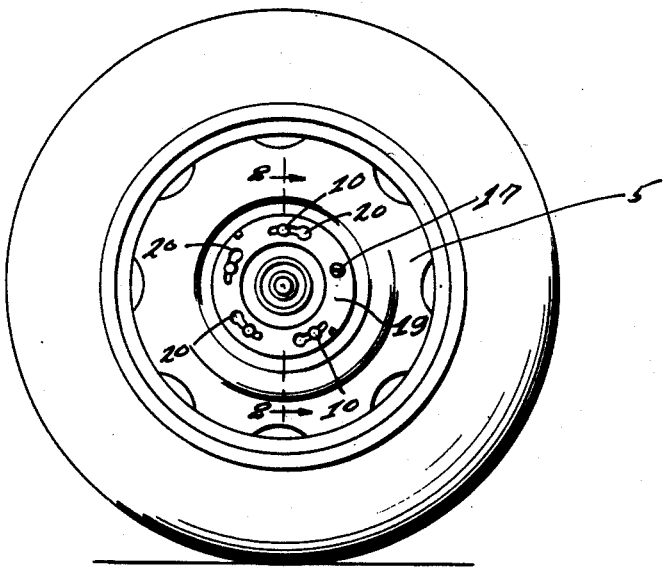
Figure 2:
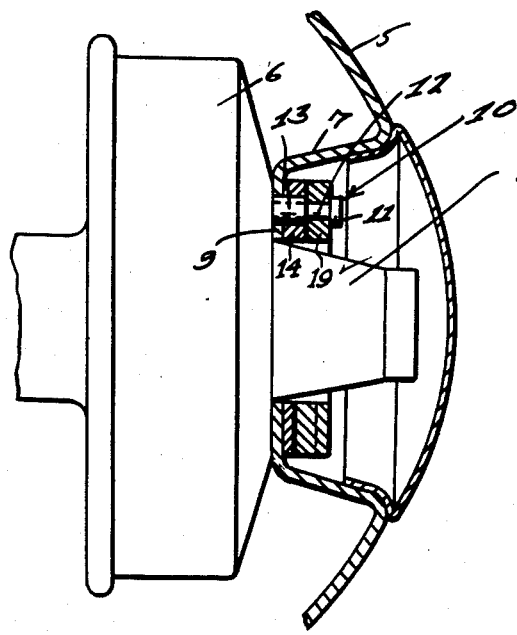
Figure 2 is a fragmentary sectional view taken on the line 2—2 of Figure 1.
Figure 4:
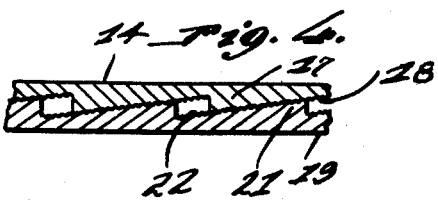
Figure 4 is a fragmentary sectional view illustrating a wedging means for preventing relative movement of the wheel on the brake drum.
Figure 3:
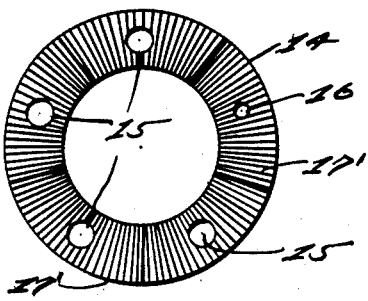
Figure 3 is a plan view illustrating one of the wedging plates.

Referring in detail to the drawing, the numeral 5 indicates a conventional type of motor vehicle wheel which is arranged for application onto a brake drum 6 of the vehicle so that said wheel can be at any time removed from the brake drum and when applied to the latter will provide a driving connection between the brake drum and the wheel.

The wheel 5 has the usual cupped portion 7 to receive the axle bearing housing 8 which forms an integral part of the drum 6 and also includes the usual apertured attaching flange 9 to receive the stud bolts secured on the drum 6.

In adapting the present invention to a construction of the character described, stud bolts 10 are employed in lieu of the conventional type of stud bolts on the drum 6 and each has a head 11, a portion 12 of one diameter and a portion 13 of a larger diameter. The openings in the attaching flange 17 are of a size to accommodate the portions 13 of the stud bolts.

An annular plate or disc 14 is provided with openings 15 to receive the portions 13 of the stud bolts and bears against the attaching flange 9 after the latter has been applied to said stud bolts.

The plate 14 is further provided with a screw threaded opening 16 to receive a securing bolt 17. One face of the plate 14 has formed thereon cam elements 17' provided with serrated faces 18. The cam elements 17' are arranged outermost from the attaching flange 9.

An annular shaped wedge plate 19 of approximately the same dimensions as the plate 14 is provided with keyhole slots 20 to receive the portions 12 of the stud bolts 10. The plate 19 has on one face thereof cam elements 21 provided with serrated faces 22 to coact with the serrated faces of the cam elements 17'. The keyhole slots permit the plate 19 to be rotated on the stud bolts and relative to the plate 14 for the purpose of bringing about a wedging action between the heads 11 of the stud bolts 10 and the attaching flange 9 of the wheel, consequently tightly securing the wheel on the drum 6 against accidental movement towards and away from the drum. It is to be understood that this wedging action takes place when the plate 19 is rotated to bring the stud bolts 10 into the restricted portions of the keyhole slots and when the plate 19 is reversely rotated the stud bolts become positioned in the large portions of the keyhole slots so that the plate 19 can be easily removed from the stud bolts and consequently permit the removal of the plate 14 from the stud bolts leaving the wheel 5 free to be removed from the stud bolts and detached from the brake drum.

The plate 19 is further provided with an opening to receive the fastening stud bolt 17 which when threaded in the opening 16 of the plate 14 will secure the plate 19 against rotation relative to the plate 14 and consequently prevent accidental detachment of the wheel from the brake drum.

A fastening means for the wheel onto the brake drum of the character specified and shown in the drawing will permit easy and quick application of the wheel onto the brake drum with a driving connection therewith and prevent the wheel from having relative movement to the brake drum in a direction towards or from said brake drum and which will permit easy and quick removal of the wheel at any time desired. Also it will be seen that the cam elements of the plates 14 and 19 will permit adjustment of the plates relative to each other to take care of any wear that may occur on the stud bolts 10 and the openings of the attaching flange 9 of the wheel 5.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a device of the class described, a vehicle wheel having an attaching flange provided with openings, studs secured to a brake drum and extending through the openings and having heads and provided with portions of different diameters, a plate having openings to receive the studs and abutting the attaching flange, cams formed on said plate, a second plate having keyhole slots to receive the studs, cams formed on the second plate and coacting with the cams of the first-named plate in establishing a wedging action between the heads of the studs and the attaching flange against the brake drum.

2. In a device of the class described, a vehicle wheel having an attaching flange provided with openings, studs secured to a brake drum and extending through the openings and having heads and provided with portions of different diameters, a plate having openings to receive the studs and abutting the attaching flange, cams formed on said plate, a second plate having keyhole slots to receive the studs, cams formed on the second plate and coacting with the cams of the first-named plate in establishing a wedging action between the heads of the studs and the attaching flange against the brake drum, said cams having serrated coacting faces.

3. In a device of the class described, a vehicle wheel having an attaching flange provided with openings, studs secured to a brake drum and extending through the openings and having heads and provided with portions of different diameters, a plate having openings to receive the studs and abutting the attaching flange, cams formed on said plate, a second plate having keyhole slots to receive the studs, cams formed on the second plate and coacting with the cams of the first-named plate in establishing a wedging action between the heads of the studs and the attaching flange against the brake drum, said cams having serrated coacting faces, said first plate having a screw threaded opening and said second plate having an opening to match the screw threaded opening, and a stud bolt to enter the latter-named opening and to thread into said screw threaded opening of the first-named plate.

JERRY J. GAQUINTO.